March 24, 1953  W. W. EATON ET AL  2,632,360
DOCUMENT FEED MEANS FOR FLOW FILM PHOTOGRAPHIC APPARATUS
Filed Oct. 4, 1949  7 Sheets-Sheet 1

Inventors
William W. Eaton
Harold T. Olson

Attorney

March 24, 1953    W. W. EATON ET AL    2,632,360
DOCUMENT FEED MEANS FOR FLOW FILM PHOTOGRAPHIC APPARATUS
Filed Oct. 4, 1949    7 Sheets-Sheet 2

Inventors
William W. Eaton
Harold T. Olson
Attorney

INVENTORS
William W. Eaton
Harold T. Olson
BY
ATTORNEY

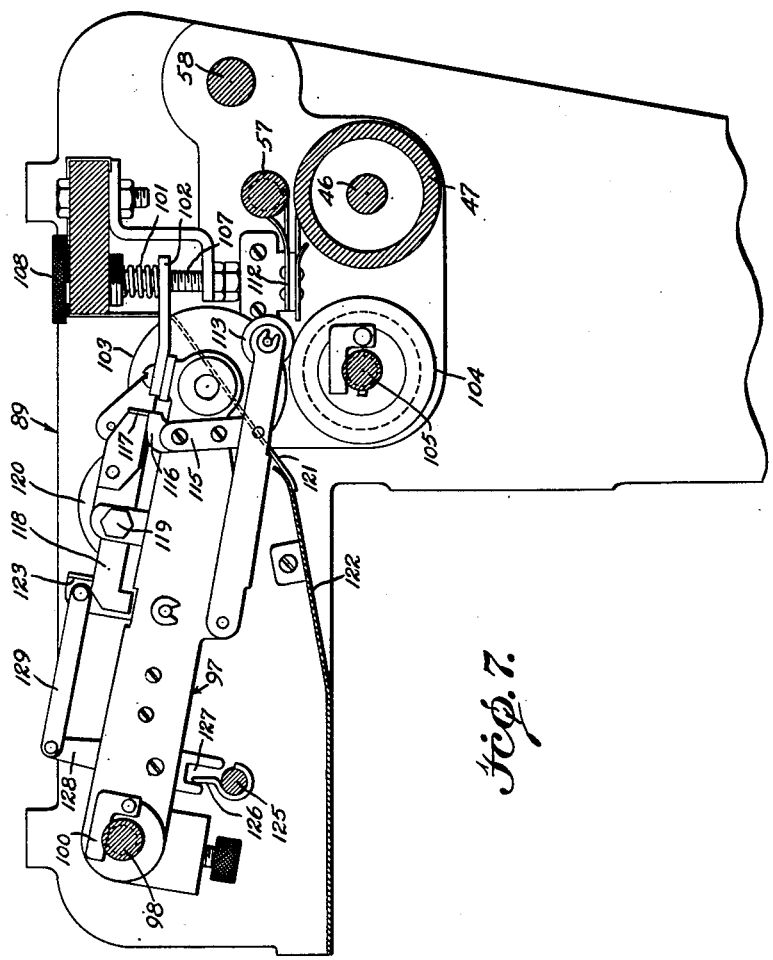

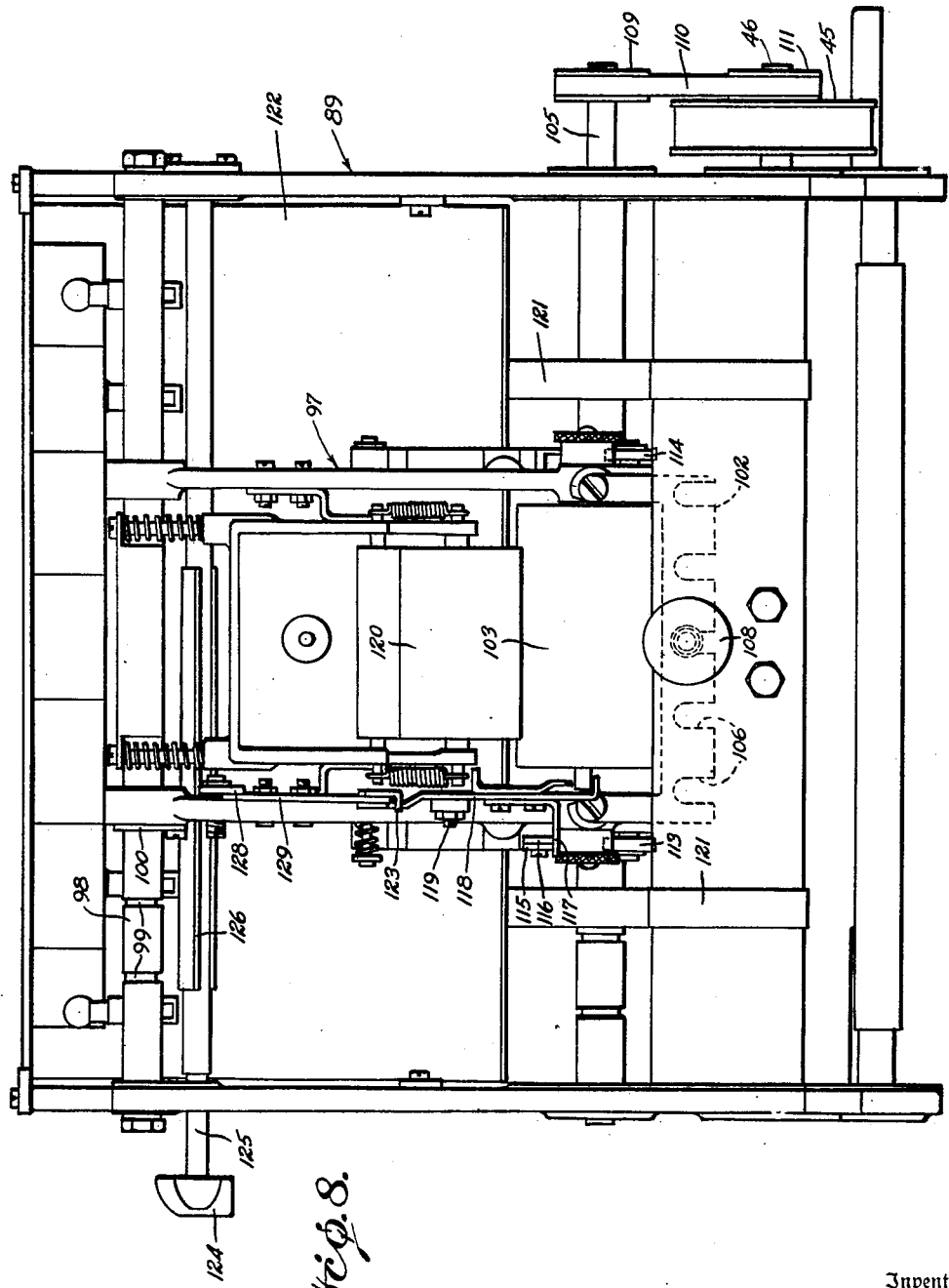

Patented Mar. 24, 1953

2,632,360

UNITED STATES PATENT OFFICE 2,632,360

DOCUMENT FEED MEANS FOR FLOW FILM PHOTOGRAPHIC APPARATUS

William W. Eaton, Milford, Conn., and Harold T. Olson, Baldwin, N. Y., assignors to Remington Rand Inc., New York, N. Y., a corporation of Delaware Application October 4, 1949, Serial No. 119,527

10 Claims. (Cl. 88—24)

1

This invention relates to flow film photographic apparatus and is especially concerned with improvements in the means for feeding documents one at a time into, through and away from the document gate in which they are illuminated for photographically recording on moving film driven at a predetermined rate of travel relative to the rate of document feed through the gate.

The invention has among its objects the provision of flow film photographic apparatus in a compact, self-contained and attractive form presenting considerable operational advantage over prior art apparatus. To that end, the invention provides the apparatus in a structural form embodying the document gate, the means for illuminating the gate, and the document feed means at one end of the apparatus for enclosure in a compartment presenting a mainly flat top at normal desk top level with an entrance opening to the document feed mechanism in the top at a point accessible from both the side and the end of the apparatus, the exit end of which document feed mechanism delivers the photographed documents to a point of the casing from which they are accessible for collection externally of the apparatus.

In the fullest embodiment of the invention the entire apparatus is enclosed by a casing of desk like form at which the operator can work seated or standing as he or she may desire. In such an embodiment the casing is constituted by a floor engaging camera compartment extending from front to back at the end of the apparatus remote from the document feed mechanism, a narrow floor engaging motor compartment enclosing a motor drivingly connected with the document and film feed means, and a substantially rectangular horizontal compartment enclosing the document gate and the illuminating means and at least mainly enclosing the document feed means, merged into the top of the camera and motor compartments to overhang laterally beyond the camera compartment in front of said motor compartment. In that way the camera and motor compartments cooperate as a structure for supporting the horizontal section, which may thus present its upper surface at substantially normal desk top level with knee space at the front of the apparatus under the document feed mechanism.

It is a further feature of the fullest embodiment of the invention that, since the camera and motor compartments are adequate to define a substantial non-rocking structure, it is unnecessary to provide any ground engaging support at the outside of the knee space, thereby making it possible for an operator to move quickly from a seated posture at the front of the machine to a standing posture at the end, and vice versa, which is found to provide considerable convenience from the operator's point of view.

Although it is within the field of the invention that the documents can be discharged from the document feed mechanism for collection at any point accessible externally of the machine, it is preferred that the discharge terminal of the document feed means shall be embodied in a super-structure overhanging the rear portion of the desk top. In that way the entrance to the document feed mechanism can be left unobstructed at the front part of the apparatus over the knee space, and the documents can be fed for overhead discharge into a receiving tray placed on the desk top toward the back of the apparatus but still conveniently accessible to a seated operator.

The invention also contemplates the provision of means for endorsing those checks which have passed through the machine. The endorsing attachment may be of any convenient form effective for endorsing a check at any point in its passage from the aperture to its final discharge from the machine. In the preferred embodiment of the invention, where the overhead discharge is provided in the underside of a head portion of a superstructure overhanging the desk top at the document feed end of the machine, a door or panel is provided at the top of the head portion which can be opened or removed for installation of the endorser, which may thus derive its drive direct from the conveyor drive, and at the same time is readily accessible to the operator.

It is preferred to use a standard endorser marketed by Commercial Controls Corporation of Rochester 2, New York. The type of endorser employed is preferably a modification of the "Clark Endorser" originally based on a series of patents in the name of Paul J. Clark including, for example, U. S. patents numbered 1,709,897; 1,883,572; 1,892,136; and 1,987,816. The modification involves the substitution of mechanical trip means for the normal electrically actuated trip means, and it is a feature of the endorser installation according to the present invention that means are provided externally of the machine whereby, by an extremely simple operation, the operator can instantly render the endorser operative or inoperative as may be required. The invention also includes the provision of means for adjusting the endorser attachment transversely whereby the endorsement can be applied to a point of the document not already occupied by a previous endorsement.

In the accompanying diagrammatic drawings, in which like reference numerals are employed to indicate corresponding parts in the various figures:

Fig. 7 is a detail side elevation of a typical endorser installation, and

Fig. 8 is a plan view of the endorser mechanism shown in Fig. 7.

Figure 1:
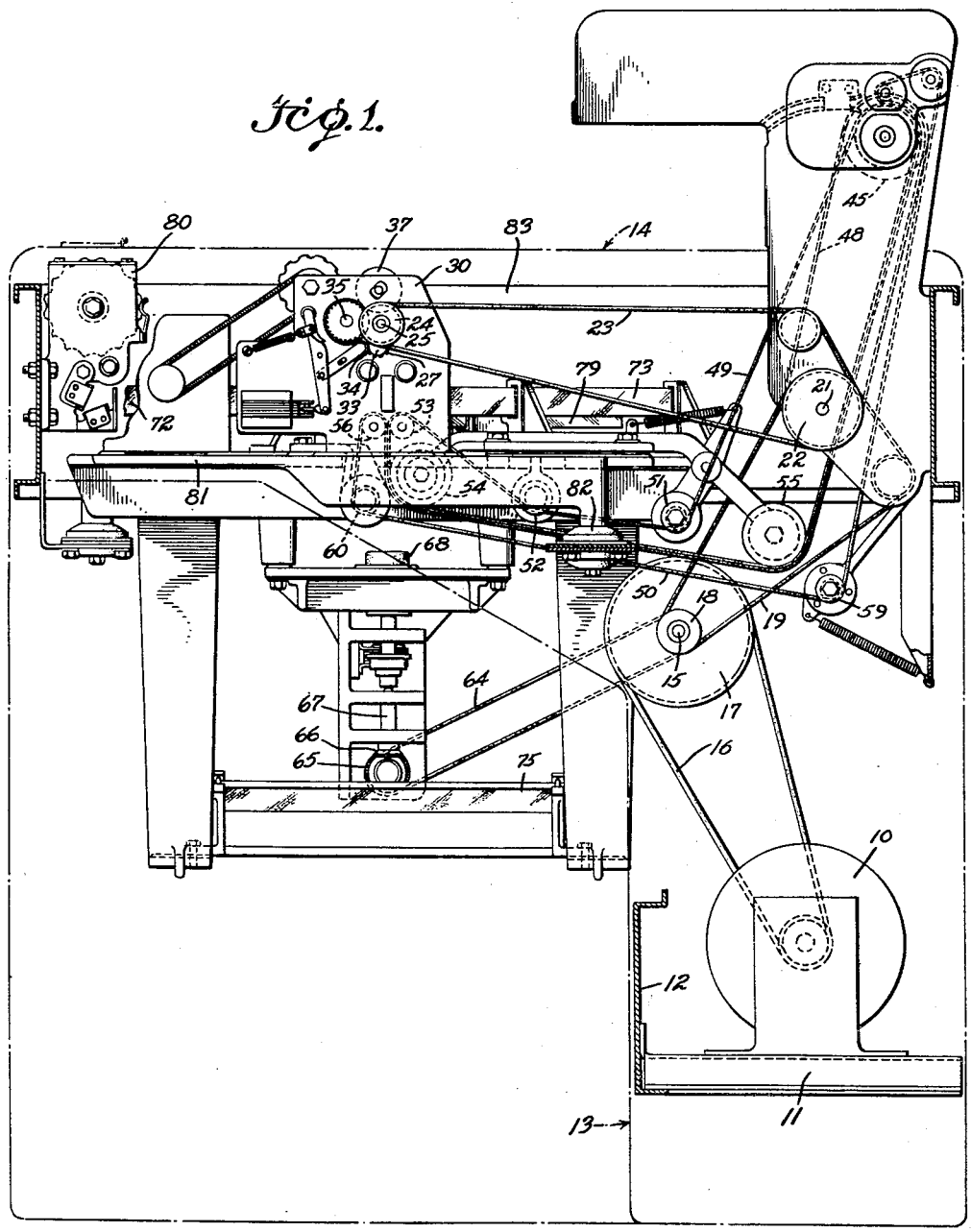
Fig. 1 is an end elevation looking on the document feed end of the apparatus with the casing omitted but indicated generally in dot and dash line the better to reveal the internal mechanism.
Figure 2:
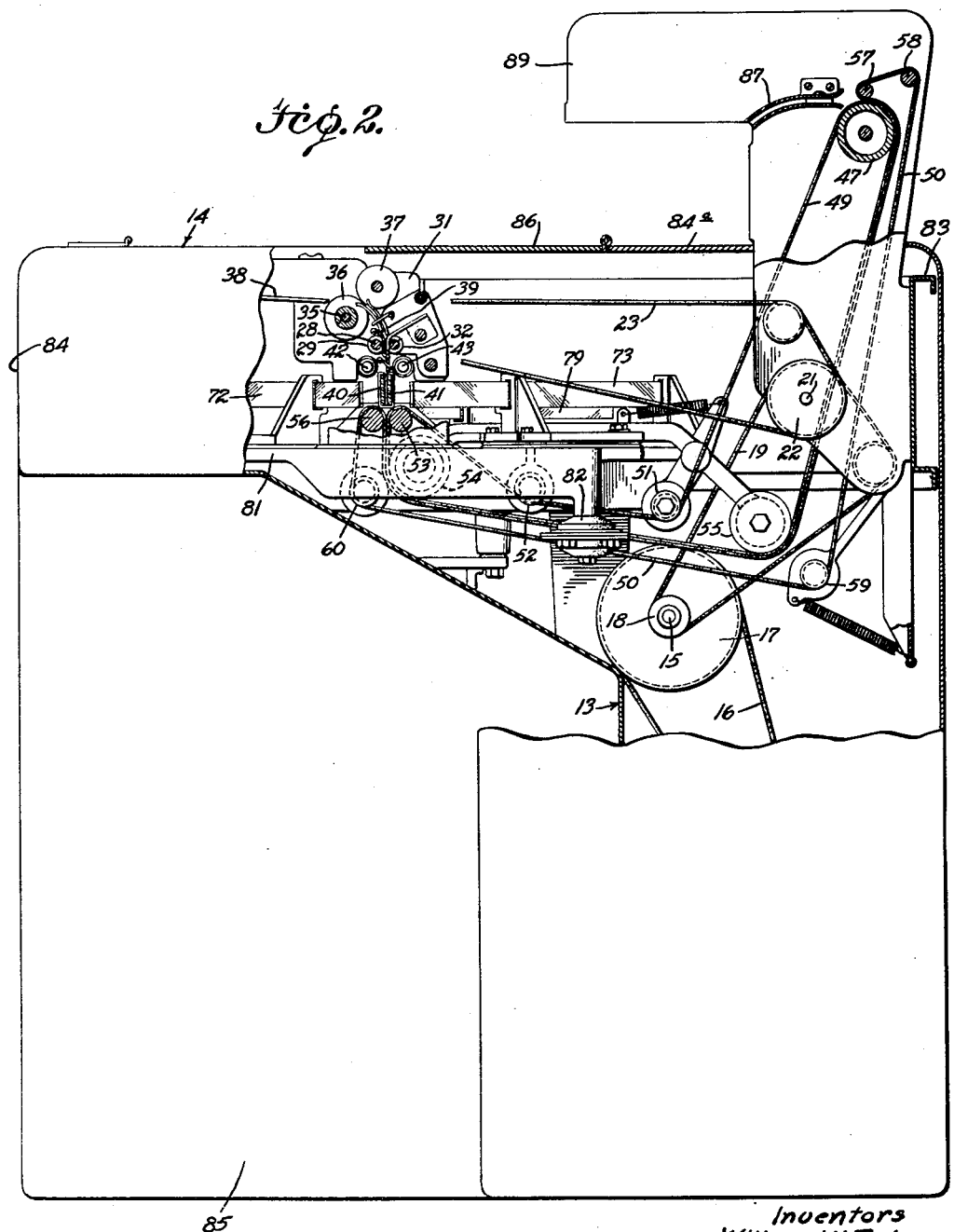
Fig. 2 is an end elevation corresponding to Fig. 1 but partly in section to reveal the document feed mechanism in the region of the document gate, the casing here being shown in full lines and partly broken away.
Figure 3:
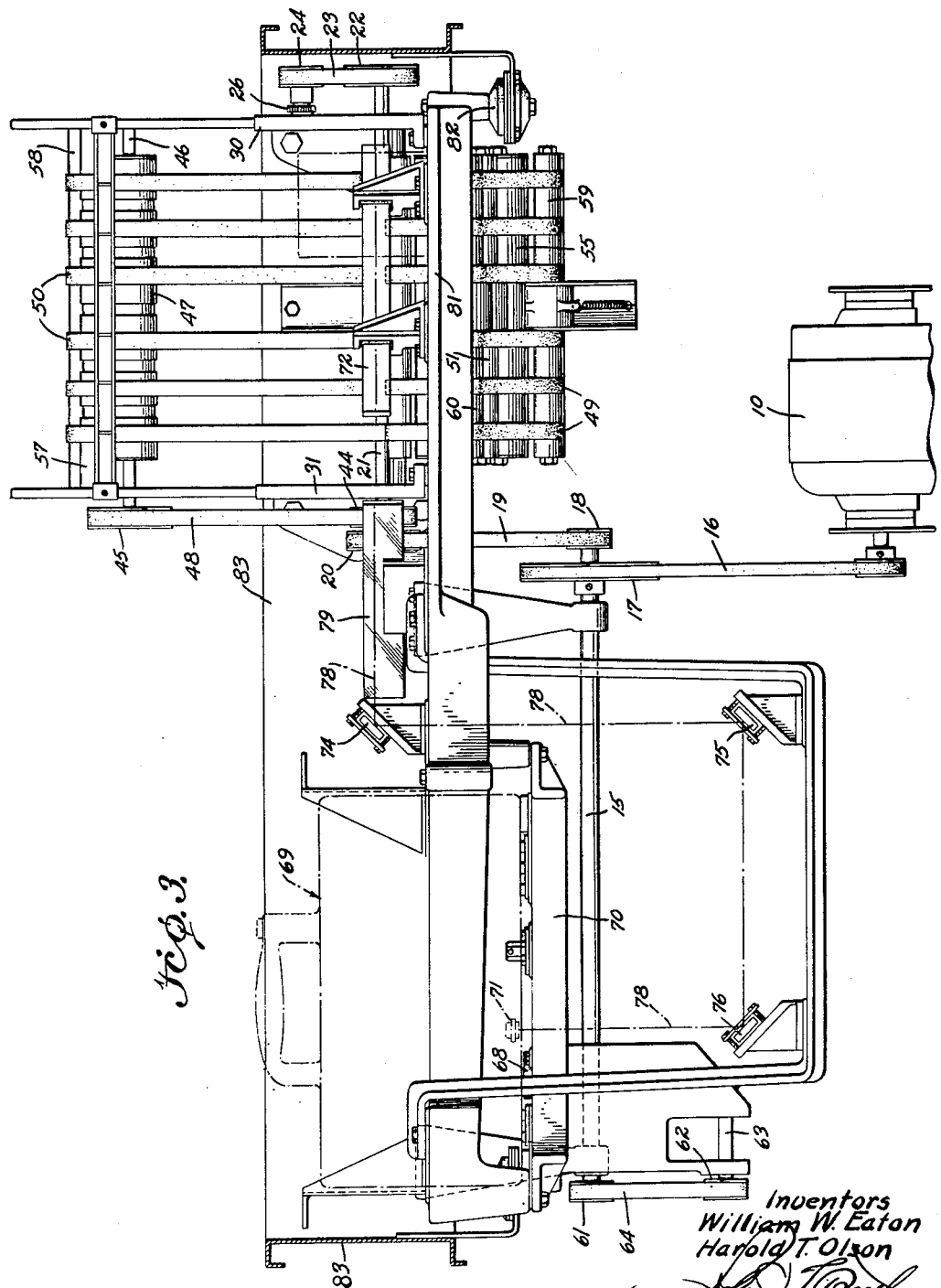
Fig. 3 is a front elevation of the mechanism as seen with the casing removed.

Referring now to Figs. 1 to 4 of the drawings, which illustrate a preferred embodiment of the apparatus, the motor 10 is mounted on a substantial supporting base 11 attached by the bracket 12 to the motor compartment 13 of the casing, generally indicated by the reference numeral 14. The bracket is preferably welded to the interior of the casing, which is of sheet metal of substantial gauge in order to constitute a rigid and self-supporting structure. The drive for document feed and the camera drive for film feed are both derived from the jack shaft 15 driven by the motor through the belt 16 and the main jack shaft drive pulley 17. From a pulley 18 on the inner end of the jack shaft, the belt 19 drives the pulley 20, see Fig. 3, on the end of the document feed counter shaft 21, at the other end of which the pulley 22 drives the document feed rollers through the belt 23 engaging the pulley 24 on the shaft 25 of which the drive pinion 26, see Fig. 3, is provided. The drive pinion 26 meshes with the pinion 27, see Fig. 1, on the end of the feed roller shaft 28, which mounts the driven feed roller 29, see Fig. 2.

The means which define the document gate, the document feed mechanism in the vicinity of the gate, and the means for illuminating the traveling document in its passage through the gate, are mounted on the turret construction constituted by the end wall 30, see Fig. 1, and the opposite end wall 31, see Fig. 2, the details whereof are best understood with reference to Fig. 2.

Thus, in Fig. 2, it will be seen that a feed roller 32 is mounted in parallel interengaging relationship with respect to the driven feed roller 29. The feed rollers 29 and 32 are preferably covered with rubber to provide a degree of resilience adequate to accommodate varying thicknesses of documents. The feed roller 32 need not be driven but is rotatable by virtue of its engagement with the driven feed roller 29, or, with a document when one is engaged between the feed rollers.

Figure 4:
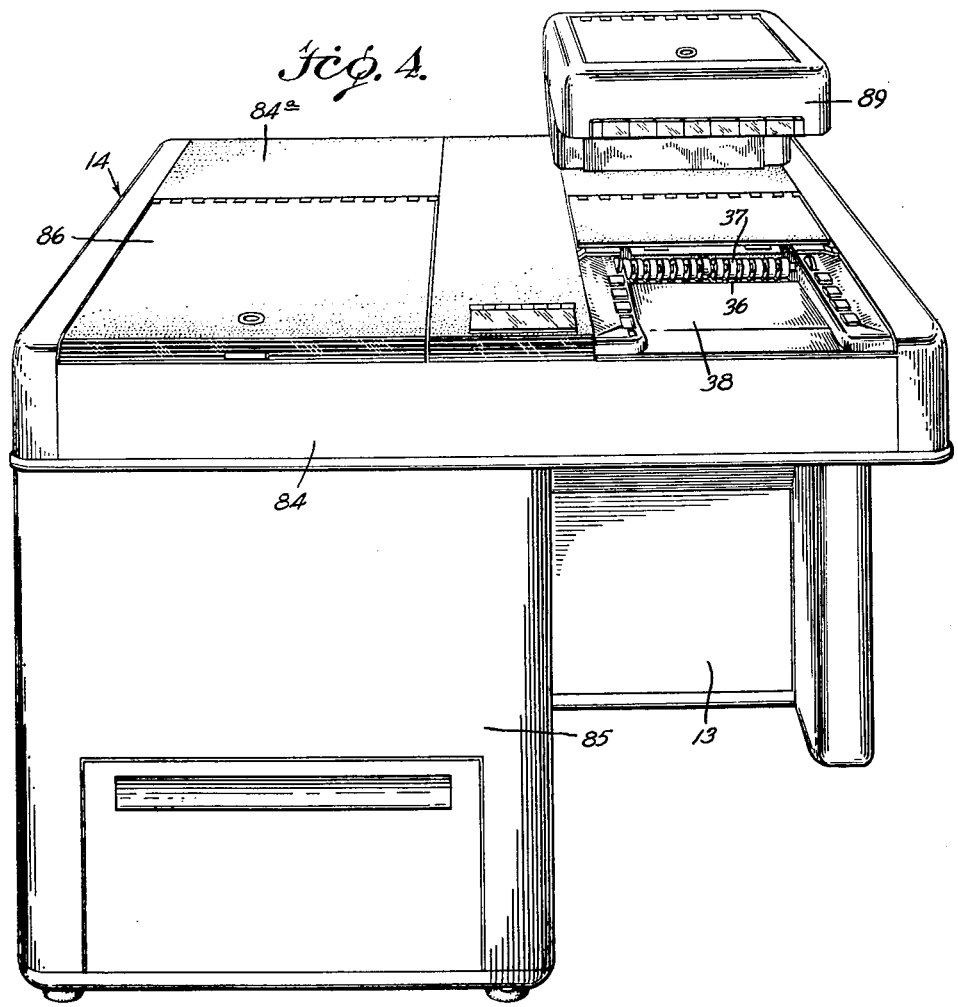
Fig. 4 is a perspective view looking on the front of the apparatus in its full complete preferred embodiment.

An annulus 33, see Fig. 1, is provided on the outer end of the driven feed roller shaft 28, which through an intermediate drive roller 34, transmits drive to the shaft 35 which mounts the driven entrance roller 36. An entrance roller 37 in parallel normally engaging relationship, cooperates with the driven entrance roller 36 as a pressure roller for feeding documents engaged between them. The entrance rollers are of grooved formation and are seen in Fig. 4 at the inner extremity of the document feed panel 38, the inner end of which is also seen in Fig. 2.

When the apparatus is in operation, the driven feed and entrance rollers 29 and 36 respectively are driven for rotation clockwise as viewed in Fig. 2, and consequently the cooperating pressure and feed rollers 32 and 37 respectively rotate anticlockwise, and a guide member 39 constituted by a series of laterally spaced slats, guides each document in its feed passage from the entrance rollers to the feed rollers. The document gate, which functions in a manner analogous to the film gate of a camera to maintain the portion of the document being photographed in a plane accurately located with respect to the camera lens, is defined by spaced transparent plates 40 and 41, which preferably are united at their ends in appropriately spaced relationship for insertion and removal as a unit. Tubular lamps, preferably of the fluorescent type and indicated in Fig. 2 by the reference numerals 42 and 43, are provided for illumination respectively of the front and the back of a document in the gate.

A pulley 44 on the document feed drive counter shaft 21 is connected with the pulley 45 on the shaft 46 which mounts the conveyor drive roller 47 by the belt 48. The cooperating pairs of belts 49 and 50 are driven by the drive roller 47 and operate to provide a laterally spaced series of upper and lower belt members for conveying documents from the document gate of the machine to a remote point for convenient discharge from the machine. As shown in Figs. 1 to 4, the arrangement of the belts is such that an overhead document discharge is provided. As viewed in Fig. 2, the upper belts 49 engage under the tension roller 51 and the intermediate roller 52, passing therefrom over the entrance end terminal roller 53 and returning downwardly under the rollers 54 and 55 and then upwardly back to the drive roller 47. Thus, with the drive roller 47 driven for anticlockwise rotation as viewed in Fig. 2, the terminal roller 53 also rotates anticlockwise and the belts 47 are driven correspondingly.

The cooperating terminal roller 56, on the other hand, is operated for clockwise rotation and corresponding movement of the lower belts 50. The course of the lower belts 50 from the terminal roller 56 can be traced in their direction of movement downwardly under the rollers 54 and 55 from which they run upwardly to engage the upper sector of the drive roller 47 for driving engagement therewith, from which they pass over the two head terminal rollers 57 and 58 before extending downwardly under the tension roller 59 and the roller 60 back to the entrance end terminal roller 56.

At the other end of the machine, a pulley 61 on the jack shaft 15, see Fig. 3, drives a pulley 62 on the shaft 63 through the belt 64. At its inner end, the shaft 63 mounts a drive bevel 65, see Fig. 1, cooperating with the bevel 66 on the lower end of the camera drive shaft 67. At its upper end, the camera drive shaft 67 has a coupling member 68 adapted for engagement with a cooperating coupling member on the film feed drive shaft of the camera. The camera is seen in dot and dash line in Fig. 3 where it is indicated by the reference numeral 69. The drive coupling 68 projects through the support base 70 upon which the camera rests, being locked in position thereon when properly installed for operation.

The camera is preferably of the type described in the copending application of Harold T. Olson, Serial No. 119,529, filed concurrently herewith, but so far as the present invention is concerned, it suffices to explain that the lens is provided substantially centrally at the bottom of the camera as indicated in dot and dash line at 71.

It will be appreciated that since the document feed mechanism and the camera feed film drive are both derived from the jack shaft 15, a predetermined relationship between film feed and document feed will be achieved for successful flow film photographing of documents as they pass in succession through the document gate.

As the document travels through the illuminated gate its image is picked up at the first reflector stage constituted by the dual mirrors 72 and 73. The mirror 72, being at the front of the document gate reflects the image of the front of the document onto the front half of the mirror 74, which constitutes a second reflector stage, onto the rear half of which the image of the back of the document is reflected by the mirror 73. Thus, the total image of both the front of the document and the back thereof are resolved in side by side relationship at the secondary reflector stage mirror 74, which has its reflecting surface inclined downwardly as best seen in Fig. 3 for reflection of the resolved image onto the tertiary reflector stage mirror 75 for reflection therefrom onto the final reflector stage mirror 76 from which it is reflected through a slot in the camera support base 70 into the camera lens 71.

The path of the image is indicated in Fig. 3 by the dot and dash line 78 and it will be appreciated that, with the folding of the optical path of the reflected image, such path is of appreciable length despite the physical proximity of the camera to the document gate, thereby making it possible to take advantage of the improved definition available at narrow angles of lens coverage.

The reference numeral 79, in Fig. 3 indicates a clear glass plate interposed in the image path between the primary reflector stage rear mirror 73 and the secondary stage mirror 74. One side of the clear glass plate 79 is coated with anti-reflection film, but its nature is such that it does not interfere with the passage of light reflected from the mirror 73 onto the secondary stage mirror 74. On the other hand, however, due to its angular relationship to the index data projector 80, it will reflect the illuminated image of index data projected therefrom onto the secondary stage mirror 74, and therefrom, via the tertiary and final stage mirrors 75 and 76 respectively, through the camera lens onto film in the camera. The index data projector and its manner of operation are described in the application of the applicants hereof S. N. 119,526, now abandoned, filed concurrently herewith. Since, however, the provision of indexing means is not an essential feature of the present invention further description here is unnecessary.

It will be seen from the drawings that the main framework of the apparatus is of substantial construction. The primary and secondary mirror stages are mounted on a rigid chassis plate 81 from which the camera support base and a support cradle for the tertiary and final reflector stages are suspended. Such an arrangement provides a unitary structure of very rigid construction which is unlikely to be disturbed by any ordinary operational vibration when the machine is working, especially since the motor 10 is not directly connected with the main chassis plate 81.

Since the whole of the mechanism virtually constitutes a unitary structure in compact form, it is a simple matter to adapt it for enclosure in a compact and attractive casing presenting considerable operational advantage over flow film photographic apparatus as hitherto proposed. Thus, the apparatus may be suspended on vibration deadening members one of which is clearly indicated at 82 in Fig. 3, from the rectangular supporting frame or girder structure 83. With such a mode of suspension the girder structure itself can be welded to the interior of casing means of widely different forms. It is, however, a feature of the invention that the casing shall be in the form of a convenient desk-like structure and in that respect attention is now directed to Fig. 4.

It will be seen from Fig. 4 that horizontal top casing section 84 presents its top portion as a flat surface 84a at desk level. The girder section rectangular frame can be welded or otherwise secured to the inner surface of the horizontal casing section 84, and all the document feed mechanism in the vicinity of the document gate, the gate itself, and the lighting means for illumination of the document in the gate can be accommodated in the horizontal section 84.

At the left-hand end of the casing, the end pedestal section and camera compartment 85 provides for enclosure not only of the camera and support for the horizontal top casing section but also the tertiary and final mirror stages. As the motor is at the back of the apparatus it is an important feature that the rear casing section and motor compartment 13 need not extend forwardly to the front of the machine. The absence of any ground engaging support at the right-hand front part of the machine in no way interferes with the steady support of the machine on the floor since there is no mechanism of any appreciable weight enclosed by that part of the horizontal section 84, and consequently the center of gravity of the machine as a whole is on the other side of a diagonal extending between the left-hand front corner and the right-hand rear corner of the casing. The absence of the fourth corner support moreover presents a considerable operational advantage because it gives access to the knee space under the overhanging portion of the horizontal compartment 84 either from the front, or from that end of the machine, which is especially convenient as many operators find that for some purposes it is more convenient to work at the front of the machine, whereas for other purposes it is more convenient to work at the side, and since there is no corner support in the way, the operator can move quickly from a seated position at either station to a standing position at the other station.

Access doors are provided on the casing to facilitate servicing and normal operation of the machine. Particularly it should be noted that the camera is mounted in such a manner that it is accessible through the top of the machine on opening the camera access door 86.

It may be stated that the fullest embodiment of the apparatus includes many features of novelty related, for example, to the arrangement and disposition of the lighting system for document illumination in the document gate, which, as well as various controls for switching on the lamps and for driving the film only when documents are fed to the entrance rollers, and various details of document feed, are believed to present considerable advantage over prior art constructions of flow film photographic apparatus. All of those details are, however, fully described in the applications Serial Nos. 119,525 and 119,526 filed concurrently herewith by the same applicants as the instant application.

In operation of the machine documents to be photographed are fed in turn either manually or by suitable mechanical check feeding means between the entrance rollers 36 and 37 at the inner end of the panel 38. With entrance roller drive, the documents are fed along the guide 39, between the feed rollers 29 and 32 into the illuminated document gate, the traveling image of the document in its passage through the gate being reflected in focused relationship onto film of the camera as hereinbefore described. On the other side of the aperture the document engages between the merging belts of the conveyor system to be fed first downwardly, then rearwardly and then upwardly for discharge out of the machine through the guide 87, see Fig. 2, into a receptacle conveniently placed on the desk top below the head fitting 89.

Although the overhead document discharge provided by the preferred embodiment of the invention so far described with reference to Figs. 1 to 4 is considered to be most convenient from the operator's point of view, overhead discharge is not absolutely essential within the scope of the invention provided the photographed documents are delivered for collection at some point which is conveniently accessible externally of the apparatus. Thus, with respect to the modification shown in Fig. 5, the conveyor system can be replaced by a pair of rollers 90, 91 immediately below the exit from the document gate. At least one of the rollers 90, 91 is driven for rotation at the same peripheral speed as the driven feed roller 29 so that with a document engaged between the rollers 90, 91 the former rotates clockwise and the latter anticlockwise for document feed. Conveniently either or both of the rollers 90, 91 can be driven by belt or gear means from the main document feed drive pulley 24, see Fig. 1, and with the rollers appropriately driven the documents after passage through the document gate are directed in their descent into the collecting tray 92 by the guide plate 93. The tray itself can be withdrawn through the end wall of the casing at the document feed end of the casing for removal of the documents.

Figure 5:
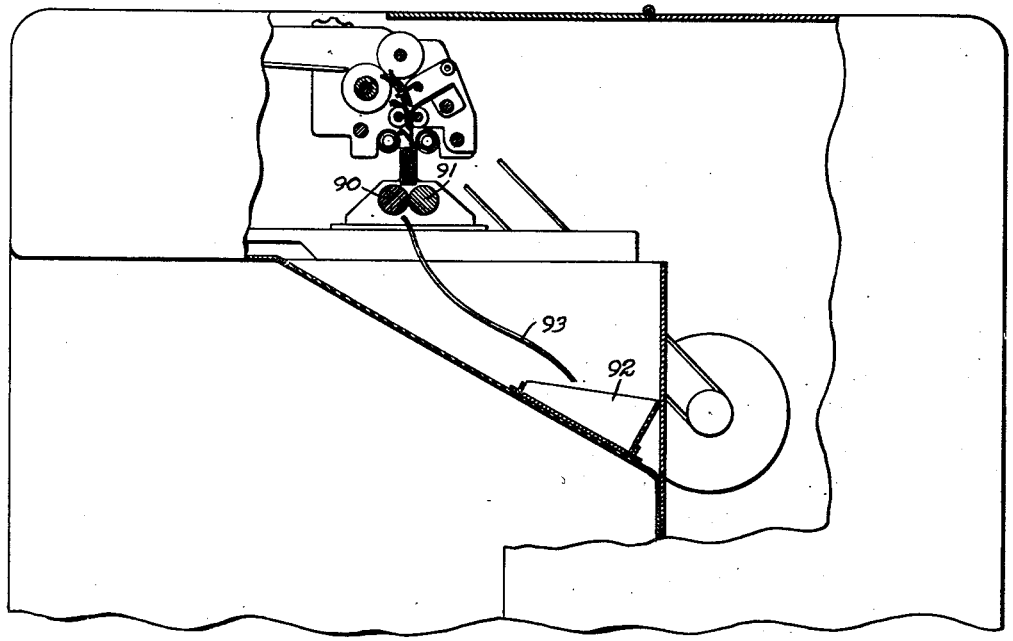
Fig. 5 is a fragmentary end view of modified document feed means.

It will be appreciated that when the leading edge of a document has passed through the document gate, its leading edge will engage between the belts at the entrance terminal to the conveyor belt system of the Figs. 1 to 4 construction or between the rollers 90, 91 of the Fig. 5 construction while the trailing part of the document is still engaged between the feed rollers 29 and 32. It is therefore important that the peripheral speeds of the feed rollers 29 and 32 shall exactly correspond with the peripheral speeds of the belts 49 and 50 of Fig. 1 or the rollers 90, 91 of Fig. 5, otherwise the feeding of the intermediate part of the document still in the document gate may be irregular enough to cause imperfect photographing of the recorded image. Despite all normal precautions in that respect it is sometimes found that, with documents of greater than normal length, some lack of synchronization is apt to occur if the leading edge of a document gripped between the merging flights of the belts 49 and 50 reaches the turn around the roller 54 while a trailing part of the document is still in the document gate. A modified construction has therefore been developed to overcome the difficulty and will now be described with reference to Fig. 6.

Figure 6:
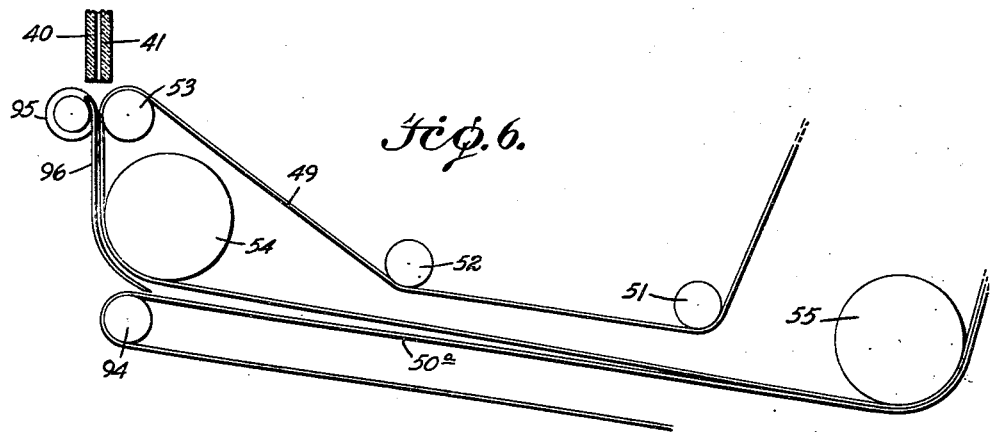
Fig. 6 is a fragmentary end view of a further modified document feed means applicable mainly to the preferred constructional forms of Figs. 1 to 4.

Thus, in Fig. 6, where the document gate plates 40 and 41 and the lower part of the upper belts 49 and the cooperating conveyor belt rollers are indicated by the same reference numerals as used in Figs. 1 and 2. The lower belts are modified to the extent that the entrance end terminal is located in spaced relation below the roller 54 instead of at a point immediately adjacent the exit of the document gate as is the case with the construction described with reference to Figs. 1 and 2. The modified lower flight of the lower belts is indicated in Fig. 6 by the reference numeral 50a and the terminal roller at the entrance end by the reference numeral 94. A roller 95 opposite the terminal roller 53 cooperates with the roller 53 for document feed, and is provided with grooved formations spaced longitudinally. From each groove a guide slat 96 extends downwardly, curving at its lower extremity into space provided between the belts 49 and the upper flight of the belts 50a under the roller 54, with the result that the document is not gripped by the converging belt flights until it closely approaches the rear roller 55, by which time the document will have passed completely out of the gate.

The endorser installation shown with reference to Figs. 7 and 8 is of the type already referred to as marketed by the aforesaid Commercial Controls Corporation and is indicated generally by the reference numeral 97. The endorser unit 97 is installed in the overhanging portion 89, being mounted on the cross-bar 98 at the front end of the overhanging portion 89. The cross-bar 98 is provided with several spaced slots 99, see Fig. 8, in any selected one of which the pivoted catch 100 can be engaged. The alternative slots provide for lateral adjustment of the endorser as a whole. At the other end the endorser is pressed downwardly by the spring 101 which bears on the pressure plate 102 to press the printing roller 103 into engagement with the impression roller 104, which is also adjustable on its shaft 105 to conform with the lateral adjustment of the endorser as a whole. The pressure plate 102 is provided with slots 106, see Fig. 8, into which the locating bolt 107, see Fig. 7, projects for location of that end of the endorser unit. The slots 106 are spaced to correspond with the spacing of the slots 99 and in making the lateral adjustment it suffices to raise the plate slightly against the pressure of the spring 101 until the plate is clear of the top of the adjustment bolt 107. The spring pressure is adjustable by operation of the knurled adjustment screw head 108.

The pulley 109 on the impression roller shaft 105 is driven by the belt 110 from the pulley 111 on the shaft 46 which drives the conveyor drive roller 47. In Fig. 7 the conveyor drive roller 47 is seen corresponding with its showing in Figs. 2 and 3 but with the belts omitted.

Documents leaving the exit terminal of the conveyor system are fed through the modified guide 112 to engage between the impression roller and the spaced pressure rollers 113 and 114. Behind the pressure roller 113 as viewed in Fig. 7 there is provided a trip finger which is engaged by the leading edge of a document to actuate the trip lever 115 to disengage the catch 116 from the projection 117 on the lever 118 pivoted at 119. At each operation of the trip lever the printing roller rotates by engagement with the document for endorsement of the document, the printing plate of the endorser being inked by contact with the inking roller 20. The deflector fingers 121 serve to deflect the document downwardly for discharge out of an opening under the plate portion 122.

The endorser is shown in an inoperative position in which it is locked because the catch 123 engages the lever 118 to override the trip mechanism and so prevent the printing roller 103 from descending into the endorsing position. The locking catch 123 can be swung out of its engagement with the lever 118, when it is desired to render the endorser operative by actuation of the endorser control knob 124. The endorser control knob shaft 125 carries the projector 126 which engages the slot 127 in the lever 128 which carries the locking catch actuating link 129. Thus, if the shaft 125 is rotated clockwise as viewed in Fig. 7 the lever 128 swings anticlockwise about an intermediate pivotal connection with the endorser body to withdraw the locking catch 123 and the endorser will then operate.

The invention claimed is:

1. In flow film photographic apparatus for micro-filming moving documents in their contniuously moving passage through an illuminated document gate, the combination of said gate, means for illuminating documents while moving through said gate, document feed means associated with said gate for feeding documents continuously at a constant rate of feed through said gate, and a casing enclosing said gate, said illuminating means, and said feed means, said casing being provided with a flat top portion at substantially normal desk-top level with said feed means and said gate disposed below the plane of said flat top portion and with a superstructure having a portion overhanging said flat top portion, an entrance in said casing providing access to said document feed means, said entrance being located near the top front portion of said compartment but below said flat top portion, and document discharge means including a plurality of conveyor belts for conveying documents away from and to the rear of said gate under said top portion and illuminating means, said conveying means having a rear portion extending upwardly and formed with a discharge terminal in said super-structure adapted to discharge photographed documents on said flat top portion in close proximity to said entrance.

2. In flow film photographic apparatus for mirco-filming moving documents, a document gate, document feeding and conveying means for passing documents into, through, and away from said gate, means for illuminating documents in their continuous passage through said gate, a camera having means for feeding film therethrough, means for driving said film feed means and said document feed and conveying means at predetermined related speeds, reflecting means for directing to the lens of said camera the images of documents moving through said gate, and a casing having a flat top portion at substantially normal desk-top level comprising a substantially rectangular horizontal compartment enclosing said gate and document feed means, said gate and said feed means being disposed below the plane of said flat top portion, said casing being provided with an entrance to said document feed means adjacent the front of one end of said horizontal compartment and having a floor engaging camera compartment depending from said horizontal compartment at the other end thereof and a floor engaging motor compartment depending from said horizontal compartment at the back of the first mentioned end thereof, said camera compartment and said motor compartment providing the only supports for said casing, said document feeding and conveying means having portions adjacent said gate extending under said illuminating and reflecting means and to the rear of said casing under said flat top portion to an upwardly extending portion projecting through said top portion for delivering documents on to the upper surface of said top portion and said casing being further provided with unobstructed knee space under said horizontal compartment at the corner thereof adjacent said entrance.

3. Apparatus for flow film photographic copying of documents as set forth in claim 2 in which said casing is provided with a super-structure housing said upwardly extending portion of said document conveying means, said super-structure having a portion overhanging the top of said horizontal compartment and an opening therein for discharging on the plane of said flat top documents carried by said conveying means.

4. Apparatus for flow film photographic microfilming of documents in their continuously moving passage through an illuminated document gate as set forth in claim 1, in which there is provided in said super-structure selectively operable means for endorsing documents prior to their discharge through said discharge terminal.

5. Apparatus for flow film photographic microfilming of documents in their continuously moving passage through an illuminated document gate as set forth in claim 1, in which there is provided within said super-structure selectively operable means for endorsing documents prior to their passage through said discharge terminal and means operable externally of said apparatus for selectively setting said endorsing means into operative and inoperative positions.

6. Apparatus for flow film photographic microfilming of documents in their continuously moving passage through an illuminated document gate as set forth in claim 5, in which said selectively operable endorsing means is provided with a mounting permitting adjustment of said endorsing means laterally of the normal path of document feed.

7. In a flow film photographic apparatus for micro-filming continuously moving documents comprising a substantially horizontal main chassis plate, a casing supporting said chassis plate having a horizontal top section above said plate in spaced substantially parallel relation, a document gate mounted on the top intermediate portion of said chassis plate below said top section having a passage for documents therethrough, said top section having an entrance opening formed in the front portion of said top section adjacent said gate, means for conveying documents from said entrance opening to one side of said gate, photographing means having portions mounted on top of said chassis plate in the rear of said gate, a document conveyor having a front section for receiving documents from the lower portion of said gate extending through an aperture in said chassis plate, said document conveyor having an intermediate section for conveying documents from said front section thereof to the rear of said chassis plate and said portions of said photographing means in the rear of said gate, said document conveyor having an upwardly extending delivery section at the rear end of said intermediate section and in the rear of said portion of said photographing means projecting through an opening in the rear portion of said top section and formed at the upper end to discharge documents forwardly therefrom above said top section over said portion of said photographing means and to the rear of said entrance opening in said top section.

8. In a flow film photographic apparatus for micro-filming continuously moving documents comprising a casing having a document entrance opening formed in a forward position thereof, upper portions of said casing extending rearwardly from the portion formed with said entrance opening and having a delivery opening in the rear portion thereof above said entrance opening, a document gate mounted in said casing in the rear of said document entrance opening, conveyor means mounted in said casing for conveying documents from said entrance opening into one edge of said gate, photographing means having portions on the opposite sides of said gate, and document conveyor means extending from the opposite edge of said gate around said portions of said photographing means and upwardly to the rear of said discharge opening in said casing, said document conveyor means having portions at the upper end thereof formed to discharge documents forwardly through said discharge opening on to a top portion of said casing in advance thereof and to the rear of said entrance opening.

9. In a flow film photographic apparatus for microfilming continuously moving documents comprising a casing having a document entrance opening in a forward portion of the rectangular top section thereof, a rectangular frame in said top section, a chassis plate suspended in said rectangular frame opposite said entrance opening, a gate mounted on said chassis plate opposite said entrance opening, means for conveying documents from said entrance opening to one side of said gate, photographing means mounted on said chassis plate with portions adjacent and aligned with said gate, said chassis plate having the rear edge spaced from the rear portion of said rectangular frame, and endless belt conveying means having portions carried by said chassis plate receiving documents from the other side of said gate and conveying them downwardly under said chassis plate and the portions of said photographing means aligned with said gate to the rear thereof, said endless belt conveying means having a rear portion extending upwardly between the rear portion of said rectangular frame and the rear edge of said chassis plate, through an opening in the top portion of said casing and having the upper end terminating above said top section and said entrance opening formed to discharge the documents forwardly over said top section in the rear of said entrance opening and over said chassis plate, gate and said portions of the photographing means.

10. In a photographic copying apparatus, a horizontal top casing section, a supporting frame for said top casing section, an end pedestal section of said casing supporting one end of said top casing section and frame, a rear casing section at the opposite rear end of said top casing section, said top casing section having an entrance opening in the forward portion of the opposite end thereof, document conveyong means mounted in said opposite end of said top casing section for conveyong documents from said entrance opening to a discharge opening to the rear thereof over said rear casing section, a document gate mounted in said top casing section adjacent said entrance opening and having said document conveying means associated therewith for feeding documents therethrough, photographing means having portions mounted in said top casing section and end pedestal section and cooperating with said gate, to photograph documents as they pass through said gate, drive means mounted in one of said casing sections having connections for operating said document conveying and photographing means in synchronized relation, said top casing section having a forward compartment at said opposite end provided with an unobstructed opening thereunder extending from one side of said end pedestal section and forwardly of said rear casing section through said opposite end to accommodate the lower portions of an operator's body during feeding of documents into said entrance opening from both the end and front portions of said casing, and manually operable control means for said drive means mounted on the forward portion of said top casing section at said opposite end thereof.

WILLIAM W. EATON.
HAROLD T. OLSON.

REFERENCES CITED

The following references are of record in the file of this patent:

UNITED STATES PATENTS

| Number | Name | Date |
|---|---|---|
| 1,919,957 | Lyman | July 25, 1933 |
| 1,939,446 | Hessert | Dec. 12, 1933 |
| 1,941,004 | Hessert | Dec. 26, 1933 |
| 2,177,135 | Fassel | Oct. 24, 1939 |
| 2,186,986 | Nelson | Jan. 16, 1940 |
| 2,210,472 | Strotmann | Aug. 6, 1940 |
| 2,219,458 | Sohns | Oct. 29, 1940 |
| 2,248,627 | Holbrook | July 8, 1941 |
| 2,297,573 | McDonald | Sept. 29, 1942 |